US010283994B2

(12) United States Patent
Chen

(10) Patent No.: US 10,283,994 B2
(45) Date of Patent: May 7, 2019

(54) SWITCHING CHARGING CIRCUIT

(71) Applicant: ANPEC ELECTRONICS CORPORATION, Hsinchu (TW)

(72) Inventor: Chih-Ning Chen, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 182 days.

(21) Appl. No.: 15/617,324

(22) Filed: Jun. 8, 2017

(65) Prior Publication Data

US 2018/0278076 A1  Sep. 27, 2018

(30) Foreign Application Priority Data

Mar. 22, 2017  (TW) .............................. 106109556 A

(51) Int. Cl.
    *H02J 7/00*     (2006.01)
    *H02M 1/08*     (2006.01)
    *H02M 3/158*     (2006.01)
    *H02M 1/00*     (2006.01)

(52) U.S. Cl.
CPC .............. *H02J 7/008* (2013.01); *H02M 1/08* (2013.01); *H02M 3/158* (2013.01); *H02J 7/0052* (2013.01); *H02J 2007/0059* (2013.01); *H02M 2001/0006* (2013.01); *H02M 2001/0032* (2013.01)

(58) Field of Classification Search
USPC ....................................................... 320/107
See application file for complete search history.

(56) References Cited

U.S. PATENT DOCUMENTS

| 6,329,796 | B1* | 12/2001 | Popescu | H02J 1/10 320/134 |
| 9,246,383 | B2* | 1/2016 | Brewster | H02M 3/156 |
| 9,479,060 | B2* | 10/2016 | Deng | H02M 3/1588 |
| 2008/0211473 | A1* | 9/2008 | Tlasksl | H02M 1/38 323/283 |
| 2009/0027019 | A1* | 1/2009 | Dowlatabadi | H02M 3/156 323/282 |
| 2011/0089925 | A1* | 4/2011 | Ishida | H02M 1/32 323/285 |
| 2014/0152239 | A1* | 6/2014 | Yao | H02J 7/0081 320/107 |
| 2014/0375251 | A1* | 12/2014 | Sakai | H02J 17/00 320/107 |
| 2015/0357858 | A1* | 12/2015 | Deng | H02J 7/0093 320/107 |
| 2016/0204702 | A1* | 7/2016 | Padyana | H02M 1/15 323/271 |

* cited by examiner

*Primary Examiner* — Samuel Berhanu
(74) *Attorney, Agent, or Firm* — Li & Cai Intellectual Property (USA) Office

(57) ABSTRACT

A switching charging circuit works by receiving an input voltage and then correspondingly outputting an output voltage to a battery. Within a standby duration, to assure that there is sufficient voltage provided for turning on switches in a switching circuit alternately when the switching charging circuit works in the charging duration again, a bootstrap capacitor is charged by a supply voltage. When the bootstrap capacitor is charged, a reverse current is generated by the battery and the reverse current flows towards the input end of the switching charging circuit. In addition, by means of the circuit configuration of this switching charging circuit, the reverse current originally flowing towards the input end of the switching charging circuit can flow back to the battery or to a system load.

12 Claims, 5 Drawing Sheets

SWITCHING CHARGING CIRCUIT

BACKGROUND OF THE INVENTION

1. Field of the Invention

The present disclosure relates to a switching charging circuit; in particular, to a switching charging circuit in which a reverse current generated by a battery when a bootstrap capacitor is charged can be effectively recycled.

2. Description of Related Art

Commonly, a switching circuit in a switching charging circuit mainly includes a PMOS transistor and a NMOS transistor to implement a switching mechanism. The smaller the resistances of the switches are, the better the efficiency of the switching charging circuit is achieved. However, if a transistor has a smaller resistance, its size is larger. In addition, the size unit resistance of the PMOS transistor is larger than the size unit resistance of the NMOS transistor.

Thus, to reduce the circuit area and the circuit costs, in the switching circuit, the PMOS transistor may be replaced by a NMOS transistor. As shown in FIG. 1, when the switch Q is turned on, an input voltage $V_{IN}$ is inputted to the switching charging circuit. Then, the switching charging circuit outputs a voltage to a battery through switches QN1 and QN2. In FIG. 1, the switch QN1 and the switch QN2 are both NMOS transistors. By using an inverter, the turn-on and the turn-off of the switch QN1 and the switch QN2 can be controlled by one control signal CON.

When the switch QN1 is turned on, the voltage at the node X should be almost equal to the power voltage PMID because the resistance of the switch QN1 is small. However, to turn on the switch QN1, the power voltage PMID has to overcome the gate-to-source voltage of the switch QN1. Thus, practically, the voltage at the node X cannot be almost equal to the power voltage PMID.

Therefore, to turn on the switch QN1 and to make the voltage at the node X almost equal to the power voltage PMID, a bootstrap capacitor $C_{BOOT}$ is configured in the switching charging circuit as shown in FIG. 1. When the switch QN2 is turned on, the node X is grounded, and thus a diode D is turned on by a supply voltage V1 to charge the bootstrap capacitor $C_{BOOT}$. When the switch QN2 is turned off, the voltage at the node Y is larger than the voltage at the node X by the voltage of the bootstrap capacitor $C_{BOOT}$ that is used to overcome the gate-to-source voltage of the switch QN1 for turning on the switch QN1. In this case, the voltage at the node X can be almost equal to the power voltage PMID as expected. However, when the switch QN2 is turned on to charge the bootstrap capacitor $C_{BOOT}$, the node X is grounded and thus a reverse current $-I_L$ is generated and flows from the battery BAT to the node X. Therefore, the voltage of the battery BAT decreases, and the efficiency of the switching charging circuit decreases as well.

SUMMARY OF THE INVENTION

The present disclosure provides a switching charging circuit, and the switching charging circuit has an input end and an output end. An input voltage is received via the input end of the switching charging circuit, and an output voltage is correspondingly outputted from the output end of the switching charging circuit to a battery. The switching charging circuit includes a switching circuit, an inductor, a capacitor and a fourth switch. The switching circuit is connected to the input end of the switching charging circuit through a first switch to receive the input voltage and to correspondingly output the output voltage to the battery through the inductor. The switching circuit includes a second switch and a third switch. A first end of the second switch is connected to the input end of the switching charging circuit through the first switch, and a second end of the second switch is connected to a switching node. A first end of the third switch is connected to the switching node, and a second end of the third switch is grounded. One end of the inductor is connected to the switching node, and the other end of the inductor is connected to the output end of the switching charging circuit. One end of the capacitor is coupled to a supply voltage, and the other end of the capacitor is connected to the switching node. A first end of the fourth switch is connected to the switching node, and a second end of the fourth switch is connected to the output end of the switching charging circuit. Within a standby duration, when the third switch is turned on, the capacitor is charged by the supply voltage, so a reverse current is generated by the battery and the reverse current flows to the switching node through the inductor. However, when the third switch is turned off, the fourth switch is turned on such that the reverse current flowing through the inductor flows to the output end of the switching charging circuit through the fourth switch.

In one embodiment of the switching charging circuit provided by the present disclosure, the second switch and the third switch are NMOS transistors. The first end of the second switch and the first end of the third switch are drains, and the second end of the second switch and the second end of the third switch are sources. In addition, the fourth switch is a PMOS transistor. The first end of the fourth switch is drain, and the second end of the fourth switch is source.

In one embodiment of the switching charging circuit provided by the present disclosure, the switching charging circuit further includes a detection circuit. Within the standby duration, the detection circuit detects whether the first control signal has been at low level over a predetermined time and accordingly outputs a second control signal to turn on or turn off the third switch and to turn on or turn off the fourth switch. If the first control signal has been at low level over the predetermined time, the third switch is turned on and the fourth switch remains off according to the second control signal. On the other hand, if the first control signal has not yet been at low level over the predetermined time, the third switch remains off according to the second control signal.

In one embodiment of the switching charging circuit provided by the present disclosure, the output end of the switching charging circuit is connected to a system load through the battery. Within the standby duration, the reverse current flowing through the inductor flows to the system load through the fourth switch. In another embodiment of the switching charging circuit provided by the present disclosure, the output end of the switching charging circuit is connected to the battery through the fifth switch, and also the output end of the switching charging circuit is connected to the system load. Within the standby duration, the reverse current flowing through the inductor flows back to the battery through the fourth switch.

In the switching charging circuits provided by the present disclosure, the inductor L, the fourth switch Q4 and the output end of the switching charging circuit form a loop, such that the reverse current $-I_L$ generated when the bootstrap capacitor $C_{BOOT}$ is charged within the standby duration can flow back to the battery BAT. In this manner, the efficiency of the switching charging circuit does not decrease due to the reverse current $-I_L$.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

Figure 1:
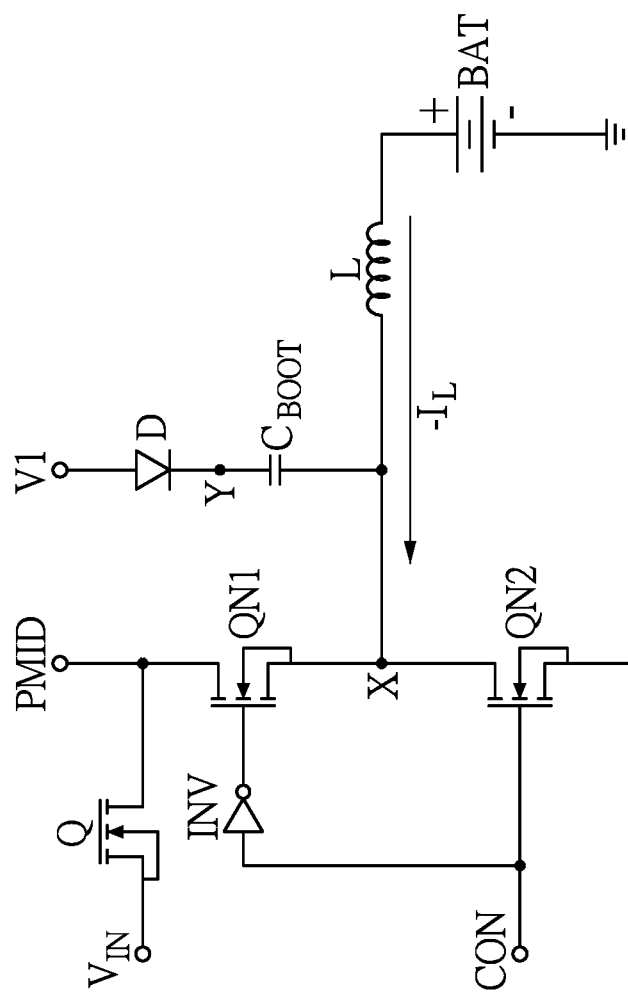
FIG. 1 shows a schematic diagram of a traditional switching charging circuit.

The switching charging circuit provided by the present disclosure can improve the efficiency of the switching charging circuit shown in FIG. 1, which is lowered by the reverse current $-I_L$. In the following description, there are lots of embodiments provided for illustrating but not for restricting the present disclosure.

[One Embodiment of the Switching Charging Circuit]

Figure 2:
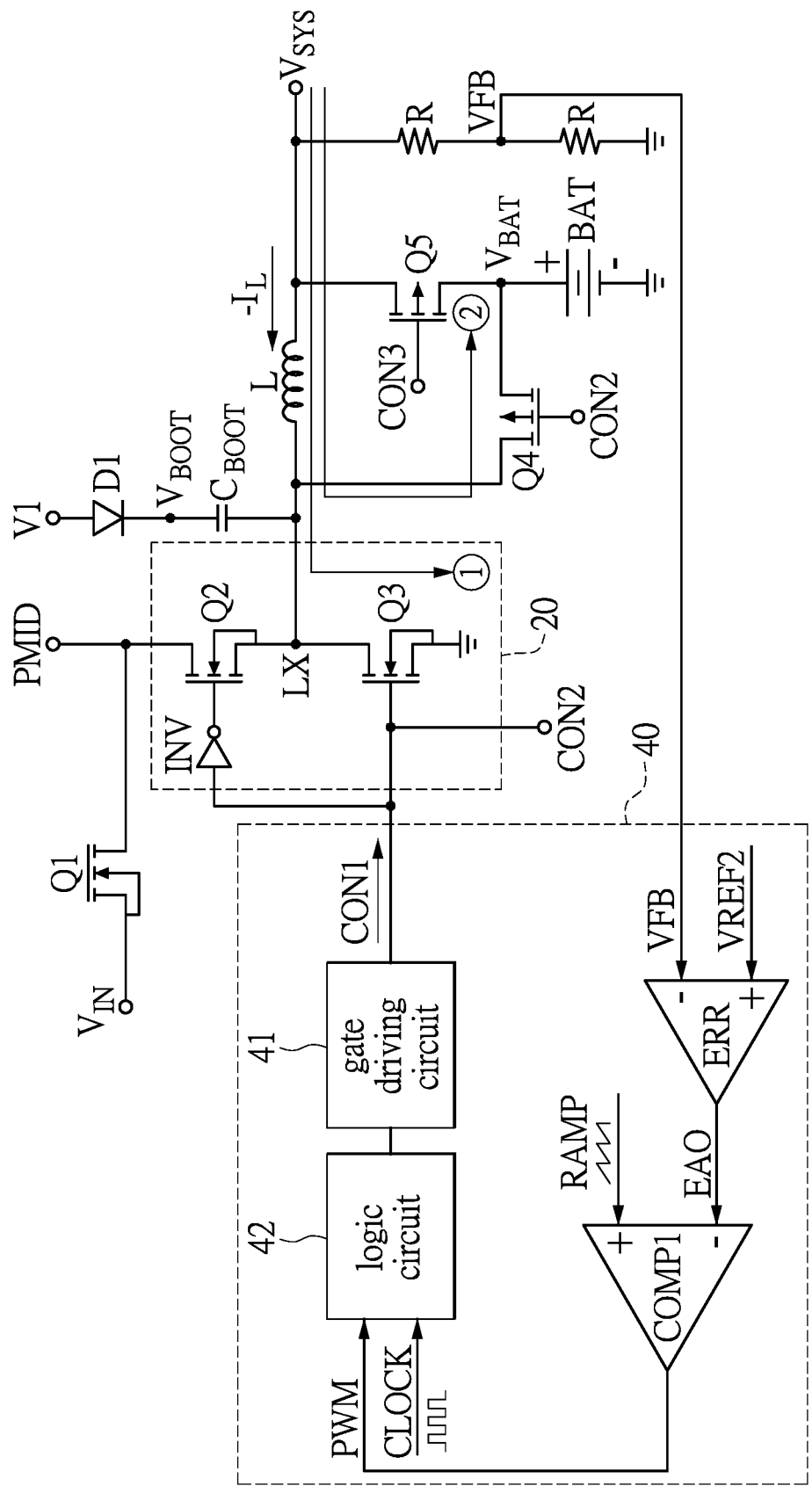
FIG. 2 shows a block diagram of a switching charging circuit of one embodiment of the present disclosure.

Referring to FIG. 2, a block diagram of a switching charging circuit of one embodiment of the present disclosure is shown. The switching charging circuit provided by the present disclosure receives an input voltage $V_{IN}$ via its input end, and correspondingly outputs an output voltage to a battery from its output end.

The switching charging circuit provided by the present disclosure includes a switching circuit 20, an inductor L and a bootstrap capacitor $C_{BOOT}$. As shown in FIG. 2, the switching circuit 20 is connected to the input end of the switching charging circuit through a first switch Q1. The switching circuit 20 receives the input voltage $V_{IN}$ and correspondingly outputs the output voltage to a battery through the inductor L. The switching circuit 20 is formed by a second switch Q2 and a third switch Q3. The first end of the second switch Q2 is connected to the input end of the switching charging circuit through the first switch Q1, and the second end of the second switch Q2 is connected to a switching node LX. The first end of the third switch Q3 is connected to the switching node LX, and the second end of the third switch Q3 is grounded. One end of the inductor L is connected to the switching node LX, and the other end of the inductor L is connected to the output end of the switching charging circuit. One end of the bootstrap capacitor $C_{BOOT}$ is coupled to a supply voltage V1 through a diode D1, and the other end of the bootstrap capacitor $C_{BOOT}$ is connected to the switching node LX.

In addition, the switching charging circuit provided by the present disclosure further includes a fourth switch Q4 and a control circuit 40. The first end of the fourth switch Q4 is connected to the switching node LX, and the second of the fourth switch Q4 is connected to the output end of the switching charging circuit. The control circuit 40 is connected between the switching circuit 20 and the output end of the switching charging circuit.

Within a charging duration (that is, within a duration in which a battery is charged by the switching charging circuit), according to the voltage at the output end of the switching charging circuit, the control circuit 40 outputs a first control signal CON1 to control the turn-on and the turn-off of the second switch Q2 and the third switch Q3. For example, the control circuit 40 can include a gate driving circuit 41, a logic circuit 42, a PWM comparator COMP1 and an error amplifier ERR. As shown in FIG. 2, the control circuit 40 obtains the information (represented by the feedback voltage VFB in FIG. 2) about the output voltage of the switching charging circuit through a voltage dividing circuit. After that, the error amplifier ERR in the control circuit 40 compares the feedback voltage VFB with a second reference voltage VREF2 to generate a compensation voltage EAO. The PWM comparator COMP1 in the control circuit 40 receives the compensation voltage EAO, and compares the compensation voltage EAO with a ramp signal RAMP to output a pulse width modulation signal PWM to the logic circuit 42 in the control circuit 40.

According to the pulse width modulation signal PWM and a clock signal CLOCK, the logic circuit 42 controls the gate driving circuit 41 to adjust the duty cycle of the first control signal CON1 and then transmits the first control signal CON1 to the second switch Q2 and the third switch Q3. In this embodiment, the second switch Q2 and the third switch Q3 are both NMOS transistors. The first end of the second switch Q2 and the first end of the third switch Q3 are drains, and the second end of the second switch Q2 and the second end of the third switch Q3 are sources. Thus, the first control signal CON1 can be directly transmitted to the third switch Q3, but it needs to be transmitted to the second switch Q2 through an inverter INV. In this case, when the first control signal CON1 is at high level, the third switch Q3 is turned on and the second switch Q2 is turned off, but when the first control signal CON1 is at low level, the third switch Q3 is turned off and the second switch Q2 is turned on. In this manner, the turn-on and the turn-off of the second switch Q2 and the third switch Q3 can be controlled. It should be noted that, as an alternative, the first control signal CON1 can be directly transmitted to the second switch Q2, but it needs to be transmitted to the third switch Q3 through an inverter INV.

Within a standby duration (that is, within a duration in which the battery is fully charged but is still connected to the switching charging circuit), the second switch Q2 and the third switch Q3 in the switching circuit 20 do not work (that is, the second switch Q2 and the third switch Q3 in the switching circuit 20 are turned off). The following description is for illustrating how to assure that there is sufficient voltage provided for turning on the second switch Q2 and the third switch Q3 alternately when the switching charging circuit works in the charging duration again (especially for turning on the second switch Q2). Within the standby duration, the third switch Q3 is turned on by a second control signal CON2, and thus the switching node LX is grounded and the diode D1 is turned on by the supply voltage V1 such that the bootstrap capacitor $C_{BOOT}$ can be charged. After the bootstrap capacitor $C_{BOOT}$ has been charged for a period of time, the third switch Q3 is turned off by the second control signal CON2. As a result, the voltage at a node $V_{BOOT}$ between the diode D1 and the bootstrap capacitor $C_{BOOT}$ is larger than the voltage at the switching node LX by the voltage of the bootstrap capacitor $C_{BOOT}$. This voltage of the bootstrap capacitor $C_{BOOT}$ is sufficient to overcome the voltage difference between the gate and the source of the second switch Q2 (that is, the gate-to-source voltage of the switch Q2). In this manner, it can be assured that when the switching charging circuit works in the charging duration again, the second switch Q2 can be fully turned on. It should be noted that, within the charging duration, when the voltage at the switching node LX is increasing, the voltage of the node $V_{BOOT}$ between the diode D1 and the bootstrap capacitor $C_{BOOT}$ is thus increased. In this case, the diode D1 is configured to avoid a situation that a current may be generated and flow from the bootstrap capacitor $C_{BOOT}$ to a source of the supply voltage V1 when the voltage of the node $V_{BOOT}$ between the diode D1 and the bootstrap capacitor $C_{BOOT}$ is larger than the supply voltage V1.

However, within the standby duration, when the third switch Q3 is turned on to make the bootstrap capacitor $C_{BOOT}$ charged by the supply voltage V1, the switching node LX is grounded and thus there is a reverse current $-I_L$ generated by the battery BAT. This reverse current $-I_L$ flows towards the switching node LX through the inductor L (that is, a current flow direction marked by ① in FIG. 2). As a result, the voltage $V_{BAT}$ of the battery BAT decreases. To prevent the voltage $V_{BAT}$ of the battery BAT from decreasing due to the reverse current $-I_L$, the fourth switch Q4 is turned on by the second control signal CON2 as soon as the third switch Q3 is turned off by the second control signal CON2. As mentioned, the first end of the fourth switch Q4 is connected to the switching node LX, and the second end of the fourth switch Q4 is connected to the output end of the switching charging circuit. Thus, when the fourth switch Q4 is turned on, the reverse current $-I_L$ flowing through the inductor L flows towards the output end of the switching charging circuit through the fourth switch Q4, and then flows back to the battery BAT to compensate the decrease of the voltage $V_{BAT}$ of the battery BAT (that is, a current flow direction marked by ② in FIG. 2). It should be noted that, in this embodiment, the fourth switch Q4 is a PMOS transistor, wherein the first end of the fourth switch Q4 is a drain and the second end of the fourth switch Q4 is a source.

The following description illustrates how the switching charging circuit provided by the present disclosure controls the turn-on and the turn-off of the third switch Q3 and the fourth switch Q4 within the standby duration.

Within the standby duration, turning on the third switch Q3 is for charging the bootstrap capacitor $C_{BOOT}$ and for assuring that the voltage of the bootstrap capacitor $C_{BOOT}$ is sufficient to overcome the voltage difference between the gate and the source of the second switch Q2 when the switching charging circuit works in the charging duration again.

Figure 4:
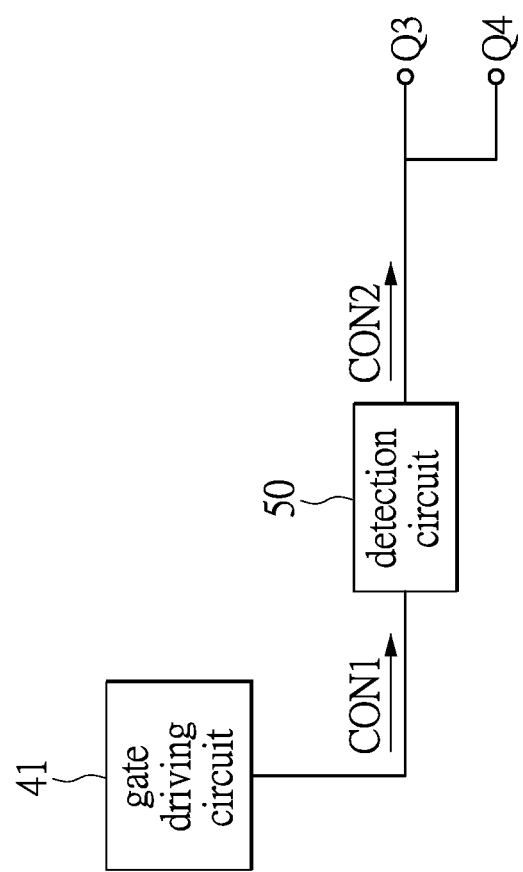
FIG. 4 shows how the switching charging circuits in FIG. 2 and FIG. 3 detect the first control signal by the detection circuit.

Referring to FIG. 4, a switching charging circuit of another embodiment of the present disclosure is shown. A detection circuit 50 is configured to detect the time interval in which the first control signal CON1 is at low level. As mentioned, when the first control signal CON1 is at low level, the third switch Q3 is turned off, and the bootstrap capacitor $C_{BOOT}$ is not charged and thus the voltage of the bootstrap capacitor $C_{BOOT}$ slowly decreases. Therefore, if the first control signal CON1 has been at low level over a predetermined time, such as 100 us, the voltage of the bootstrap capacitor $C_{BOOT}$ may be too low. In this case, the third switch Q3 needs to be turned on for charging the bootstrap capacitor $C_{BOOT}$. As shown in FIG. 4, the detection circuit 50 is connected to the gate driving circuit 41 to detect the first control signal CON1 and further to determine whether the first control signal CON1 has been at low level over the predetermined time for determining whether to output the second control signal CON2. The second control signal CON2 is to control the turn-on and the turn-off of the third switch Q3 and the fourth switch Q4.

In one example, if the first control signal CON1 has been at low level over the predetermined time, it can be determined that currently the voltage of the bootstrap capacitor $C_{BOOT}$ is insufficient to overcome the voltage difference between the gate and the source of the second switch Q2 when the switching charging circuit works in the charging duration again. Thus, the detection circuit 50 outputs the second control signal CON2 at high level to turn on the third switch Q3 for a period of time and to remain the fourth switch Q4 off, such that the bootstrap capacitor $C_{BOOT}$ can be charged. After that period of time, the detection circuit 50 outputs the second control signal CON2 at low level to turn off the third switch Q3 and to turn on the fourth switch Q4, such that the reverse current $-I_L$ flows towards to the output end of the switching charging circuit through the fourth switch Q4. On the other hand, if the first control signal CON1 has not yet been at low level over the predetermined time, it can be determined that currently the voltage of the bootstrap capacitor $C_{BOOT}$ is sufficient to overcome the voltage difference between the gate and the source of the second switch Q2 when the switching charging circuit works in the charging duration again. Thus, the detection circuit 50 outputs the second control signal CON2 at low level to remain the third switch Q3 in the off.

In another example, according to the above mentioned predetermined time, the third switch Q3 can be periodically turned on and off and the fourth switch can be periodically turned off and on. Compared with the above example, there is no detection circuit 50 provided in this example to determine whether the first control signal CON1 has been at low level over the predetermined time. Instead, in this example, the third switch Q3 is periodically turned on and off and the fourth switch Q4 is periodically turned off and on in a way designed by the producer to charge the bootstrap capacitor $C_{BOOT}$ or to make the reverse current $-I_L$ generated when the bootstrap capacitor $C_{BOOT}$ is charged flow towards the output end of the switching charging circuit through the fourth switch Q4.

Moreover, in this embodiment, the output end of the switching charging circuit is connected to the battery BAT through a fifth switch Q5, and is also connected to a system load $V_{SYS}$. As shown in FIG. 2, the fifth switch Q5 is a PMOS transistor. The drain of the fifth switch Q5 is connected to the output end of the switching charging circuit, the source of the fifth switch Q5 is connected to the battery BAT, and the gate of the fifth switch Q5 is coupled to a third control signal CON3. The third control signal CON3 is for controlling the turn-on and the turn-off of the fifth switch Q5. When the third control signal CON3 is at high level and thus the fifth switch Q5 is turned off, the reverse current $-I_L$ generated within the standby duration flows back to the battery BAT. On the other hand, when the third control signal CON3 is at low level and thus the fifth switch Q5 is turned on, the reverse current $-I_L$ generated within the standby duration flows to the system load $V_{SYS}$ through the fifth switch Q5 as a current source that the system load $V_{SYS}$ can use for operation.

[Another Embodiment of the Switching Charging Circuit]

Figure 3:
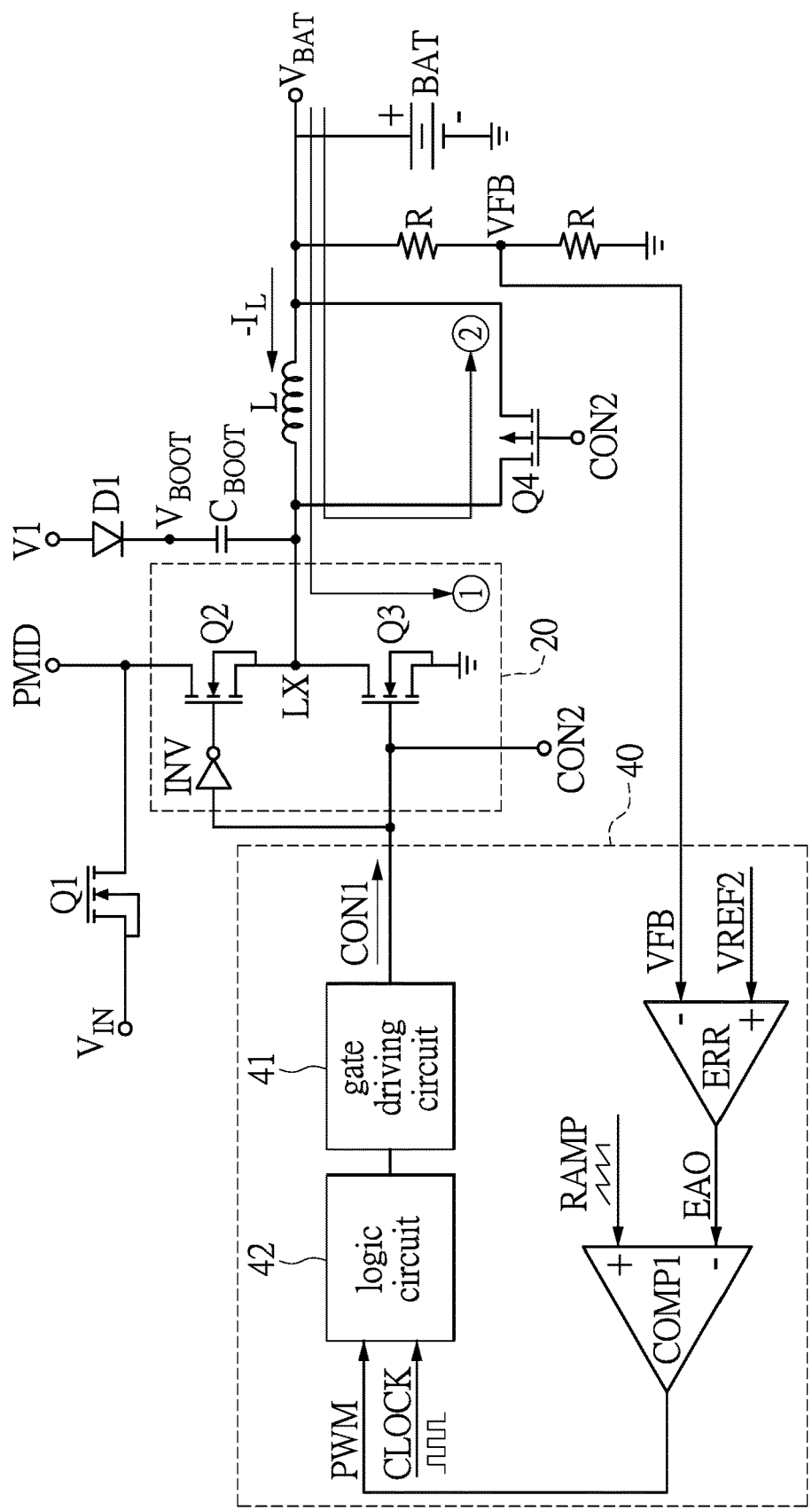
FIG. 3 shows a block diagram of a switching charging circuit of another embodiment of the present disclosure.

Referring to FIG. 3, a block diagram of a switching charging circuit of another embodiment of the present disclosure is shown. The switching charging circuit in this embodiment and the switching charging circuit in the former embodiment have similar circuit configurations and working principles. The difference between these two switching charging circuits is that there is no fifth switch Q5 configured in the switching charging circuits provided by this embodiment. As shown in FIG. 3, the source of the fourth switch Q4 is directly connected to the battery BAT. In this manner, in the beginning, the reverse current $-I_L$ generated when the third switch Q3 is turned on within the standby duration flows according to the current flow direction marked by ① in FIG. 3. However, when the third switch Q3 is turned off and then the fourth switch Q4 is turned on, the reverse current $-I_L$ flows according to the current flow direction marked by ② in FIG. 3. As a result, the reverse current $-I_L$ directly flows back to the battery BAT, and then the battery BAT provides the system load with the necessary power for operation.

Except for the above, details about how the switching charging circuit provided by this embodiment works within the charging duration and within the standby duration are similar, and thus the redundant information is not repeated. Similarly, in this embodiment, to charge the bootstrap capacitor $C_{BOOT}$ or to make the reverse current $-I_L$ generated when the bootstrap capacitor $C_{BOOT}$ is charged flow towards the output end of the switching charging circuit through the fourth switch Q4, the third switch Q3 can be periodically turned on and off and the fourth switch Q4 can be periodically turned off and on in a way designed by the producer, or the turn-on and the turn-off of the third switch Q3 and the fourth switch Q4 can be controlled by the detection circuit 50. Moreover, details about how the switching charging circuit in this embodiment controls the turn-on and the turn-off of the third switch Q3 and the fourth switch Q4 within the standby duration can be referred to the description of the former embodiment.

In the switching charging circuits provided by the above embodiments, the inductor L, the fourth switch Q4 and the output end of the switching charging circuit form a loop, such that the reverse current $-I_L$ generated when the bootstrap capacitor $C_{BOOT}$ is charged within the standby duration can flow back to the battery BAT. In this manner, the efficiency of the switching charging circuit does not decrease due to the reverse current $-I_L$. Moreover, by means of the circuit design of the switching charging circuit provided by the present disclosure, the reverse current $-I_L$ can flow back to the battery BAT for maintaining the voltage of the battery or can flow to the system load $V_{SYS}$ as a current source that the system load $V_{SYS}$ can use for operation.

Figure 5:
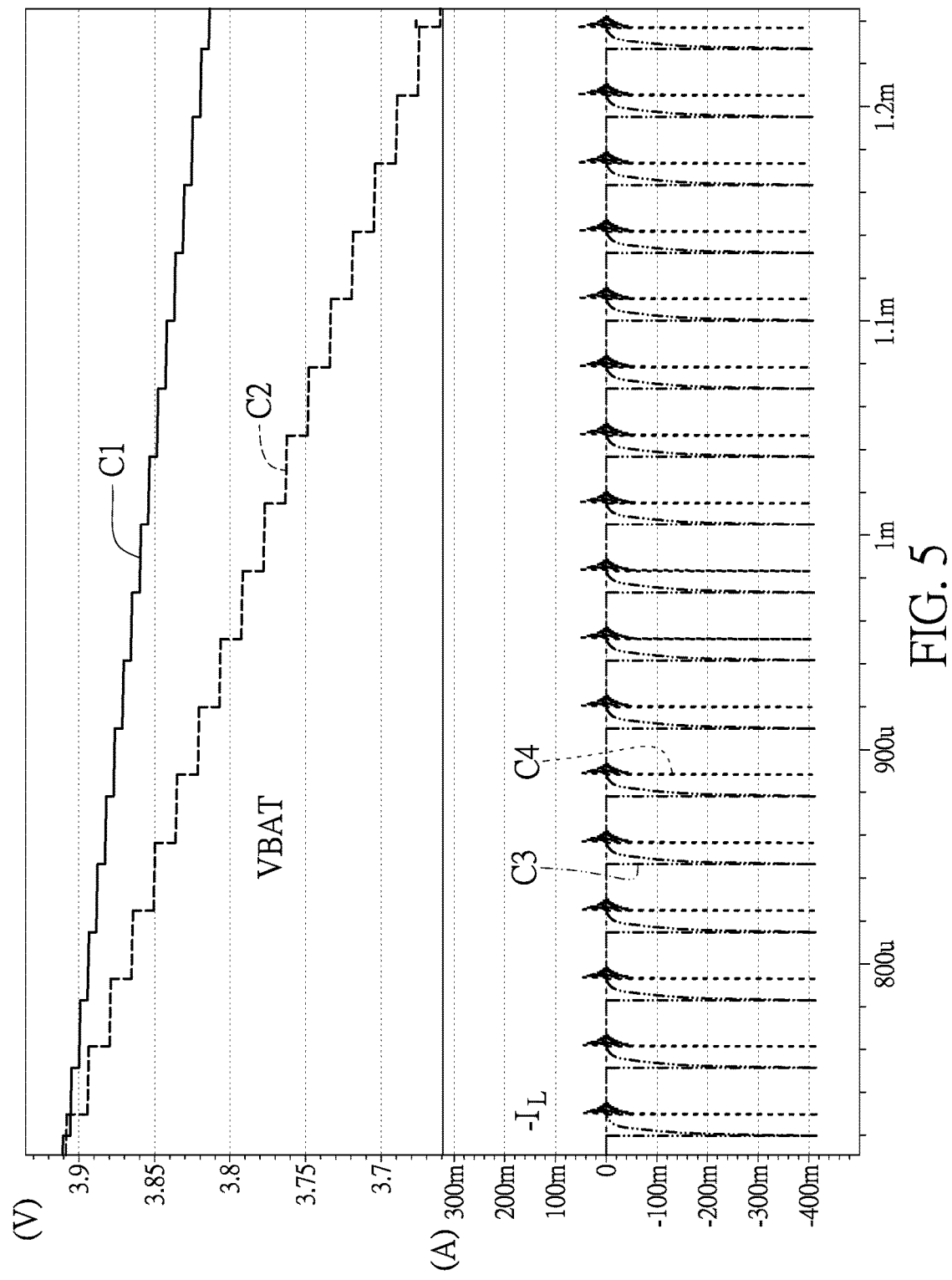
FIG. 5 shows a simulation result of the battery voltage and the reverse current in the switching charging circuit shown in FIG. 1, and also shows a simulation result of the battery voltage and the reverse current in the switching charging circuits shown in FIG. 2 and FIG. 3.

In FIG. 5, a simulation result of the battery voltage and the reverse current $-I_L$ in the switching charging circuit shown in FIG. 1 and a simulation result of the battery voltage and the reverse current $-I_L$ in the switching charging circuits shown in FIG. 2 and FIG. 3 are shown. In a traditional switching charging circuit, the voltage $V_{BAT}$ of the battery BAT decreases due to the reverse current $-I_L$ generated by the battery BAT. Thus, in FIG. 5, the simulation result C4 shows that the reverse current $-I_L$ of the traditional switching charging circuit is about −410 mA, and the simulation result C2 shows that the voltage $V_{BAT}$ of the battery BAT charged by the traditional switching charging circuit decreases to about 3.66V. Differently, in the switching charging circuit provided by the present disclosure, the inductor L, the fourth switch Q4 and the output end of the switching charging circuit form a loop such that the reverse current $-I_L$ generated when the bootstrap capacitor $C_{BOOT}$ is charged within the standby duration can flow back to the battery BAT. Thus, the voltage $V_{BAT}$ of the battery BAT decreases slightly. Therefore, the simulation result C3 shows that the reverse current $-I_L$ flowing back to the battery in the switching charging circuit provided by the present disclosure is about −410 mA, but the simulation result C1 shows that the voltage $V_{BAT}$ of the battery BAT only decreases to 3.81V.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A switching charging circuit, having an input end and an output end, wherein an input voltage is received via the input end of the switching charging circuit, an output voltage is correspondingly outputted from the output end of the switching charging circuit to a battery, and the switching charging circuit comprises:
   a switching circuit, connected to the input end of the switching charging circuit through a first switch to receive the input voltage and to correspondingly output the output voltage to the battery through an inductor, wherein the switching circuit includes:
      a second switch and a third switch, wherein a first end of the second switch is connected to the input end of the switching charging circuit through the first switch, a second end of the second switch is connected to a switching node, a first end of the third switch is connected to the switching node, and a second end of the third switch is grounded;
   the inductor, having one end connected to the switching node and having the other end connected to the output end of the switching charging circuit;
   a capacitor, having one end coupled to a supply voltage and having the other end connected to the switching node; and
   a fourth switch, wherein a first end of the fourth switch is connected to the switching node, and a second end of the fourth switch is connected to the output end of the switching charging circuit;
   wherein within a standby duration, when the third switch is turned on, the capacitor is charged by the supply voltage, a reverse current is generated by the battery and the reverse current flows to the switching node through the inductor, but when the third switch is turned off, the fourth switch is turned on such that the reverse current flowing through the inductor flows to the output end of the switching charging circuit through the fourth switch.

2. The switching charging circuit according to claim 1, further comprising a control circuit, connected between the switching circuit and the output end of the switching charging circuit, wherein within a charging duration, the control circuit outputs a first control signal to control the turn-on and the turn-off of the second switch and the third switch according to the voltage at the output end of the switching charging circuit.

3. The switching charging circuit according to claim 2, wherein the control circuit includes a gate driver, a logic circuit, a PWM comparator and an error amplifier, the inverting input end of the error amplifier is connected to the output end of the switching charging circuit through a voltage-dividing circuit, the output end of the error amplifier is connected to the inverting input end of the PWM comparator, the output end of the PWM comparator is connected to the logic circuit, and the logic circuit is connected to the gate driver.

4. The switching charging circuit according to claim 3, wherein the error amplifier obtains a feedback voltage from the output end of the switching charging circuit and compares the feedback voltage with a second reference voltage to generate a compensation voltage, the PWM comparator receives the compensation voltage and compares the compensation voltage with a ramp signal to output a pulse width modulation signal to the logic circuit, and the logic circuit controls the gate driver according to the pulse width modulation signal and a clock signal to adjust the duty cycle of the first control signal for controlling the turn-on and the turn-off of the second switch and the third switch.

5. The switching charging circuit according to claim 2, wherein the second switch and the third switch are NMOS transistors, the first end of the second switch and the first end of the third switch are drains, the second end of the second switch and the second end of the third switch are sources, the fourth switch is a PMOS transistor, the first end of the fourth switch is a drain, and the second end of the fourth switch is a source.

6. The switching charging circuit according to claim 1, wherein the capacitor is coupled to the supply voltage through a diode.

7. The switching charging circuit according to claim 3, further comprising a detection circuit, wherein within the standby duration, the detection circuit detects whether the first control signal has been at low level over a predetermined time and accordingly outputs a second control signal to turn on or turn off the third switch and to turn on or turn off the fourth switch;

Wherein if the first control signal has been at low level over the predetermined time, the third switch is turned on and the fourth switch remains off according to the second control signal, but if the first control signal has not yet been at low level over the predetermined time, the third switch remains off according to the second control signal.

8. The switching charging circuit according to claim 5, wherein the output end of the switching charging circuit is directly connected to the battery.

9. The switching charging circuit according to claim 6, wherein within the standby duration, the reverse current flowing through the inductor directly flows back to the battery.

10. The switching charging circuit according to claim 5, wherein the output end of the switching charging circuit is connected to the battery through a fifth switch, and the output end of the switching charging circuit is connected to a system load.

11. The switching charging circuit according to claim 8, wherein within the standby duration, the reverse current flowing through the inductor directly flows back to the battery through the fourth switch.

12. The switching charging circuit according to claim 9, wherein the fifth switch is a PMOS transistor, the drain of the fifth switch is connected to the output end of the switching charging circuit and the source of the fifth switch is connected to the battery.

\* \* \* \* \*